United States Patent [19]
Kasevich

[11] Patent Number: 5,152,341
[45] Date of Patent: * Oct. 6, 1992

[54] ELECTROMAGNETIC METHOD AND APPARATUS FOR THE DECONTAMINATION OF HAZARDOUS MATERIAL-CONTAINING VOLUMES

[75] Inventor: Raymond S. Kasevich, 680 Wellesley St., Weston, Mass. 02193

[73] Assignee: Raymond S. Kasevich, Woburn, Mass.

[*] Notice: The portion of the term of this patent subsequent to Nov. 19, 2008 has been disclaimed.

[21] Appl. No.: 668,280
[22] Filed: Mar. 4, 1991

Related U.S. Application Data

[63] Continuation-in-part of Ser. No. 491,005, Mar. 9, 1990, Pat. No. 5,065,819.

[51] Int. Cl.⁵ ...................... E21B 36/04; E21B 43/24
[52] U.S. Cl. ..................................... 166/248; 405/128
[58] Field of Search ................. 166/245, 246, 248, 60; 219/10.55 R, 10.65, 10.81; 405/128

[56] References Cited

U.S. PATENT DOCUMENTS

| | | |
|---|---|---|
| Re. 30,738 | 9/1981 | Bridges et al. |
| 3,803,616 | 4/1974 | Kopf et al. |
| 3,848,671 | 11/1974 | Kern |
| 4,008,765 | 2/1977 | Anderson et al. |
| 4,140,179 | 2/1979 | Kasevich et al. |
| 4,140,180 | 2/1979 | Bridges et al. |
| 4,193,451 | 3/1980 | Dauphine |
| 4,301,365 | 7/1984 | Kasevich et al. |
| 4,398,597 | 8/1983 | Haberman ...................... 166/248 X |
| 4,449,585 | 5/1984 | Bridges et al. |
| 4,457,865 | 11/1984 | Kasevich et al. |
| 4,485,868 | 12/1984 | Sresty et al. |
| 4,485,869 | 12/1984 | Sresty et al. |
| 4,524,827 | 7/1985 | Bridges et al. |
| 4,545,435 | 10/1985 | Bridges et al. |
| 4,553,592 | 11/1985 | Looney et al. |
| 4,583,589 | 4/1986 | Kasevich et al. |
| 4,638,862 | 1/1987 | Savage ................................. 166/248 |
| 4,645,004 | 2/1987 | Bridges et al. |
| 4,670,634 | 6/1987 | Bridges et al. |
| 4,700,716 | 10/1987 | Kasevich et al. |
| 4,705,108 | 11/1987 | Little et al. |
| 4,765,902 | 8/1988 | Ely et al. ......................... 166/246 X |
| 5,018,576 | 5/1991 | Udell et al. ...................... 166/246 X |

FOREIGN PATENT DOCUMENTS 1199106  1/1986  Canada.

OTHER PUBLICATIONS

Anderson, I. "Steam Cleaning Deals With Toxic Waste," New Scientist, p. 31, Nov. 26, 1988.
Oma K. H. and Buelt, J. L. "In Situ Heating to Detoxify Organic-Contaminated Soils," Hazardous Material Control pp. 14–19, Mar./Apr. 1989.
U.S. Department of Commerce. "Electro-Kinetics," in Technologies of Delivery or Recovery for the Remediation of Hazardous Waste Sites, pp. 25–30, University of Cincinnati, Cincinnati, Ohio Jan. 1990.
U.S. Department of Commerce, "Vapor Extraction," in Technologies of Delivery or Recovery for the Remediation of Hazardous Waste Sites, pp. 44–45, University of Cincinnati, Cincinnati, Ohio Jan. 1990.
U.S. Department of Commerce, "Radio-Frequency Heating," in Technologies of Delivery or Recovery for the Remediation of Hazardous Waste Sites, pp. 66–67, University of Cincinnati, Cincinnati, Ohio Jan. 1990.
Moore, Steven D. "Meridian Oil Finds Success with Horizontal Wells," Petroleum Engineer International, pp. 17–22, Nov. 1989.

*Primary Examiner*—William P. Neuder

[57] ABSTRACT

Methods for decontaminating near-surface facilities and water-containing regions of the earth contaminated with hazardous materials provide for (1) degrading hazardous materials in situ and/or (2) extracting hazardous materials from near-surface facilities in conjunction with other hazardous waste treatment technologies to produce a synergistic response for hazardous waste management. The method also includes using a phase-modulated multiple antenna system for decontaminating larger near-surface facilities or water-containing regions and for creating steerable and variable heating patterns. The radio frequency antenna apparatus can be used for extracting hazardous materials trapped in rock formations, decontaminating storage tanks, railroad cars, and oil drums, and catalyzing the microbial degradation of certain hazardous materials.

32 Claims, 8 Drawing Sheets

ELECTROMAGNETIC METHOD AND APPARATUS FOR THE DECONTAMINATION OF HAZARDOUS MATERIAL-CONTAINING VOLUMES

CROSS REFERENCE TO RELATED APPLICATIONS

This application is a continuation-in-part of Kasevich U.S. Ser. No. 491,005, filed Mar. 9, 1990, now U.S. Pat. No. 5,065,819 hereby incorporated by reference.

BACKGROUND OF THE INVENTION

The present invention relates to electromagnetic methods for the decontamination of hazardous material-containing volumes (for example, landfills, land disposal sites, low-level radioactive waste burial grounds, storage tanks, railroad cars and water-containing regions of the earth) which can be used in conjunction with other hazardous waste treatment technologies for effective hazardous waste management.

Waste management problems have been exacerbated in the second half of this century by the quantity and toxicity of the waste material generated. Waste quantities have steadily increased due to the population growth and the rapid waste generation rates. In addition, as a result of relatively recent technological innovations, waste materials have become increasingly more toxic. A partial list of hazardous materials which now pose serious environmental and human health hazards include industrial wastes from solvent uses, electrochemical applications, fertilizers, and pesticides, as well as various highly-toxic chlorinated species (for example, polychlorinated dibenzo-p-dioxins, dibenzofurane and biphenyls), and radioactive wastes, many of which were not known in the first half of this century. Soils contaminated with creosote and pentachlorophenol from the operation of wood-treating plants are also a significant environmental hazard. Better technologies are urgently needed to detoxify and isolate these and other hazardous materials from the environment.

The disposal of hazardous materials in near-surface and subsurface formations has become more expensive and difficult as available land and high-quality groundwater resources have diminished. Historical practices, either deliberate or accidental, have left numerous site legacies that must be managed. Although much concern has focussed on species migration and groundwater contaminants, more effective remediation and control may result from soil management and on-site treatment practices. In some instances, modified site operations, as well as chemical and biological treatment technologies have useful roles in waste management. For many contaminated soils, high-temperature incineration is perhaps the most obvious treatment. While appropriate for some liquid wastes, other alternatives should be considered for soil remediation. Low temperature technologies, either chemical or biological treatment, for example, can achieve similar results at somewhat slower rates.

It is an object of this invention to decontaminate hazardous material-containing volumes by using the radio frequency antenna apparatus described herein in conjunction with other known hazardous waste technology methods to obtain a significant enhancement of both technologies, from an economic and operational standpoint.

SUMMARY OF THE INVENTION

This invention relates to a method of using an electromagnetic apparatus to decontaminate hazardous material-containing volumes. The radio frequency antenna apparatus described herein is designed to carry out heating and extraction steps simultaneously. In one embodiment, the apparatus is used to volumetrically heat, and thereby reduce the viscosity of, dielectrically lossy hazardous materials (for example, coal tar residues or other organic and inorganic materials). The hazardous materials can then be collected and transported to a storage facility by, for example, the antenna acting as an extractor.

In another embodiment, the apparatus is used to increase the volatility of liquid hazardous materials. The resultant vapor is then transported to a storage facility by means of the production flow line of the antenna apparatus.

The hazardous materials can be rendered innocuous in situ, thereby eliminating the need for the extraction step, by either (1) maintaining the contaminated site at an elevated temperature for a period of time sufficient for pyrolysis, or (2) catalyzing the proliferation of degradive microorganisms in the contaminated region.

This invention also relates to methods for extracting hazardous materials trapped in impervious subsurface formations and for decontaminating storage tanks or oil drums. In addition, the invention pertains to a method of decontaminating and/or extracting hazardous materials from contaminated regions of the earth through substantially horizontal boreholes.

A phase-modulated multiple antenna system treats larger hazardous waste sites through the constructive and destructive interference of radio waves to produce the desired heating pattern. According to this embodiment of the invention, the current to each individual antenna apparatus can be appropriately phased relative to each other and as a function of time, to provide steerable and variable heating patterns.

A lateral wave propagation system treats a thin layer of hazardous material situated at, or near, the earth's surface. According to this embodiment, a radio frequency antenna is horizontally embedded in the thin layer and a lens system is employed to focus the electromagnetic energy in a lateral wave mode.

These and other aspects, objects and advantages of the present invention will become apparent from the following detailed description, particularly when taken in conjunction with the accompanying drawings.

DETAILED DESCRIPTION OF PREFERRED EMBODIMENTS OF THE INVENTION

The present invention relates to electromagnetic methods for the in situ decontamination of hazardous material-containing volumes such as storage tanks, landfills, land disposal sites, low-level radioactive waste burial grounds, lakes and ponds. The electromagnetic heating is provided by one or more radio frequency antenna apparati which have the capability to simultaneously heat and/or extract hazardous materials up through the antenna apparati themselves. The term hazardous materials shall include any man-made or naturally-occurring organic or inorganic substances, whether in solid, liquid or vapor form, which are a health risk to either human, animal or plant life.

In a preferred embodiment of the invention, the radio frequency antenna employed is based on the collinear array disclosed in Kasevich et al, U.S. Pat. No. 4,700,716, which is incorporated herein, in its entirety, by reference. However, the distal section of the collinear array antenna described herein can have apertures which are designed as portals (or inlets) for collecting the hazardous materials.

Figure 1:
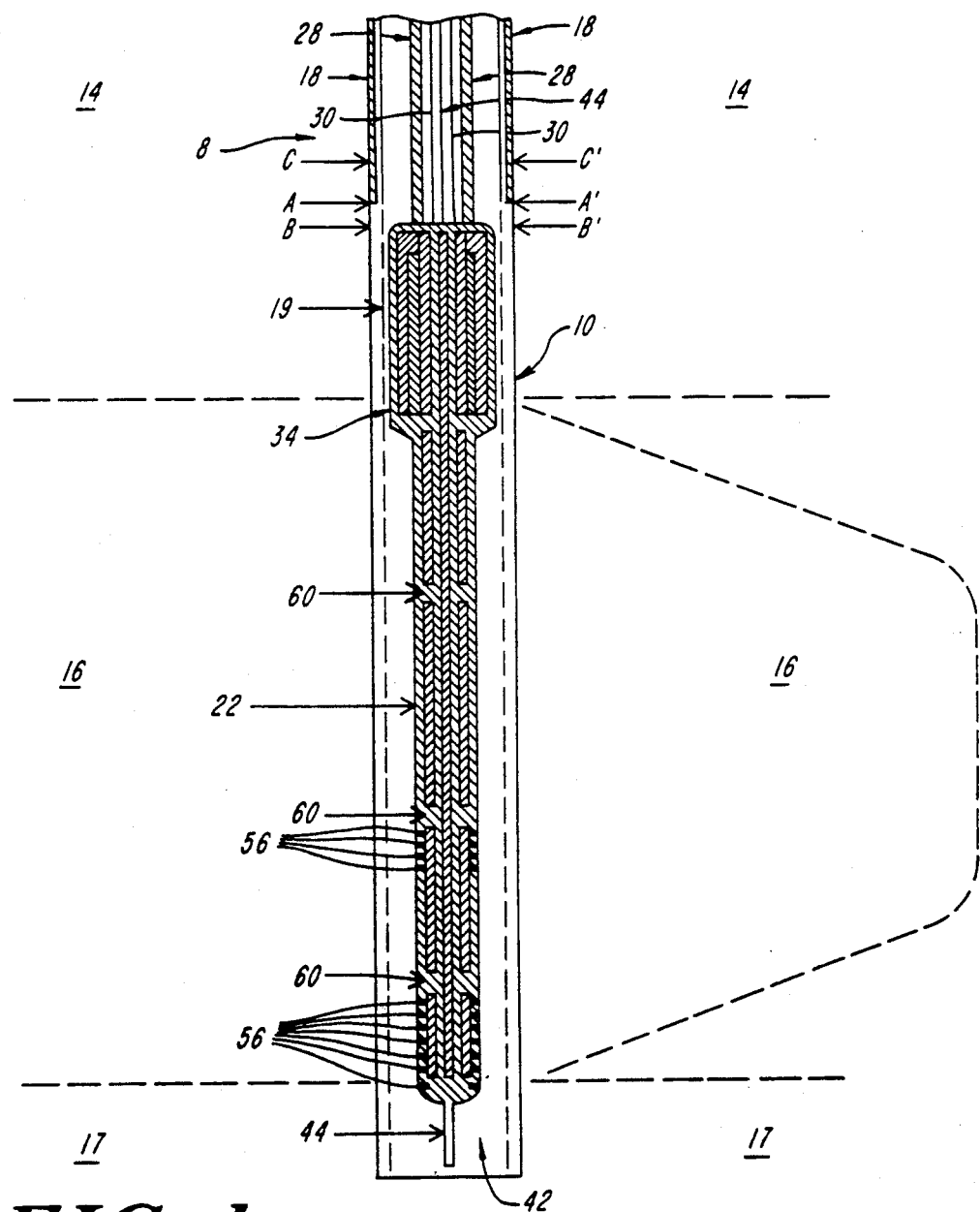
FIG. 1 is a vertical schematic sectional view of the antenna apparatus of the present invention.
Figure 3:
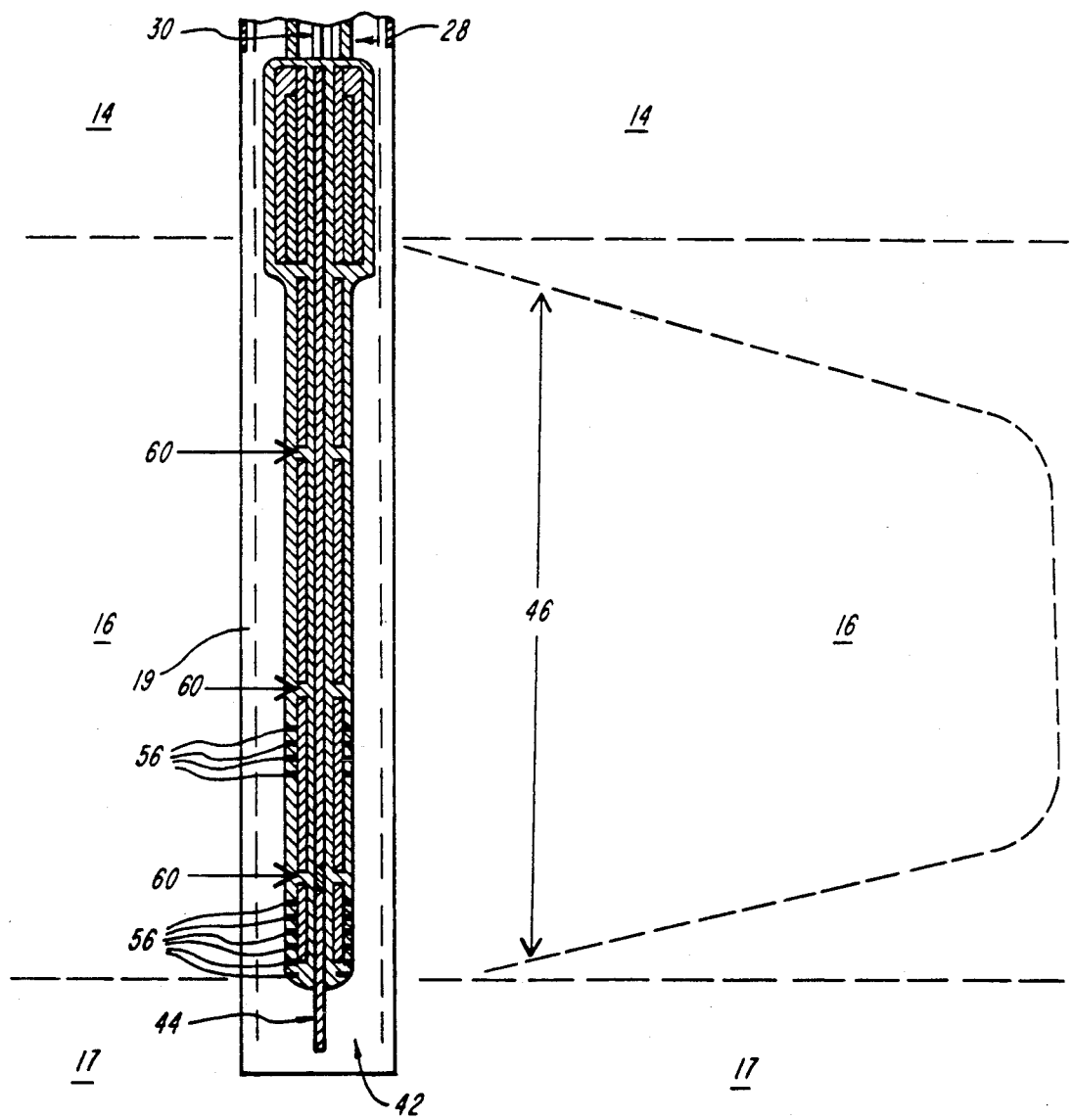
FIG. 3 is an enlarged view of the collinear antenna shown in FIG. 1.
Figure 2:
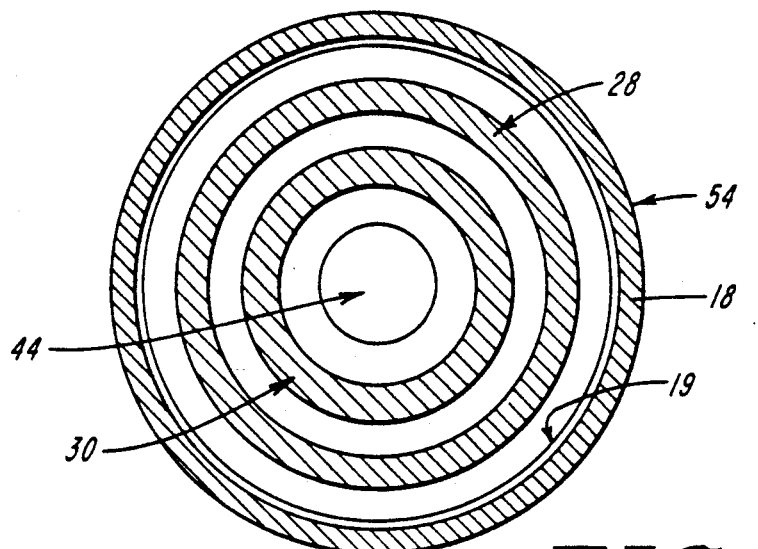
FIG. 2 is a cross-sectional view of the antenna apparatus of FIG. 1 taken along line C—C'.

Referring to FIGS. 1-3, an antenna apparatus 8, for use in accordance with one preferred embodiment of the invention, is an unbound system designed for generating near-uniform heating of hazardous material-containing volumes by radiating energy into the subsurface formation. This antenna apparatus, as will be discussed below, maximizes the coupling of energy into the specific volume of waste material being heated (for example, in soil matrices, near groundwater/soil interfaces, or in storage tanks).

In one embodiment, a borehole 10 is drilled into a region of the earth to extend from the earth's surface 12 through a layer 14 and into the region of the earth in which hazardous materials are located (the "contaminated region" 16). The contaminated region 16 overlies a layer 17. The borehole 10 is cased with a casing 18 in a conventional manner over its length through layer 14. Preferably, casing 18 is comprised of lengths of fiberglass casing or steel casing (for example, oil field casing) joined together and cemented in place in borehole 10. A radio frequency transparent liner 19 extends from the wellhead along the inner surface of casing 18 and through contaminated region 16 and into layer 17 to the bottom of borehole 10. Alternatively, radio frequency transparent liner 19 may be disposed in borehole 10 in vertical relation to casing 18, and joined thereto at position A—A'. The radio frequency transparent liner 19 is preferably made of a flexible non-conductive substance such as plastic, fiberglass, polyvinyl chloride (PVC) or a similar substance which can withstand a relatively moderate temperature environment (that is, approximately 100° C.). The section of liner 19 which is positioned adjacent to contaminated region 16 can have, and in the illustrated embodiment does have, mechanical perforations to allow liquid and/or gaseous materials to enter borehole 10.

A high power RF generator 20 transmits electromagnetic energy to a downhole radio frequency antenna over either a flexible or semi-rigid coaxial transmission line 24 The radio frequency antenna 22 is shown in the form of a collinear antenna array having, in the illustrated embodiment, three antennas fabricated from a coaxial transmission line comprising an inner conductor and an outer coaxial conductor with an impedance matching element (see below). However, it should be noted that other RF antenna designs can be used. The RF generator 20, which may be located on the earth's surface or in the borehole, is coupled to coaxial transmission line 24 by a coaxial liquid dielectric impedance matching transformer 26. The outer conductor 28 of coaxial transmission line 24 is a hollow tubular member, and the inner conductor 30 is a hollow tubular member of smaller diameter which is continuous through collinear array antenna 22. Outer conductor 28 of coaxial transmission line 24 and inner conductor 30 are spaced and insulated from one another by insulating spacers 32 (for example, ceramic discs). Multiple sections of coaxial transmission line 24 are coupled together in borehole 10 to form a string having sufficient length to reach contaminated region 16.

The collinear array antenna 22 is disposed in borehole 10 in coaxial relation to outer conductor 28 and coupled thereto at B—B' through a bifurcated transformer and choke assembly 34. The collinear array antenna 22, which is based on the collinear antenna array disclosed in Kasevich et al, U.S. Pat. No. 4,700,716, can operate at a selected frequency in the range of between 100 kilohertz (KHz) and about 2.45 gigahertz (GHz). In most cases, the volume and dielectric properties of a soil, or other subsurface formation, will determine the optimal frequency for the most effective heating results.

The antenna 22 is coupled to the distal terminus of the string, as noted above, and extends into a material collection region (for example, sump 42) of borehole 10 such that radio frequency antenna 22 may or may not be partially submerged in any liquid material collecting in the bottom of borehole 10. A production flow line 44, positioned inside inner conductor pipe 30, extends from a distal section 46 of radio frequency antenna 22 through coaxial transmission line 24 to a storage container 48. Alternatively, production flow line 44 may project through an opening in the final quarter-wavelength section of collinear antenna 22 and into liquid material which collects in sump 42. (A separate production flow line can also be used.) The production flow line is preferably made from plastic, PVC or a similar electrically non-conductive substance. The heated liquid material is lifted from sump 42 to storage facility 48 by an above-ground lifting element 50 (for example, a rocker or Moyno type pump). Alternatively, the lifting element may be positioned in sump 42 or in the final quarter-wavelength section of collinear array antenna 22. A high pressure hose 52 from above-ground lifting element 50 can be positioned between the outer surface of casing 18 and a borehole wall 54 to create a pressure gradient which will assist in the transport of hazardous or toxic materials through the production flow line 44.

Referring to FIG. 3, collinear antenna array 22 is a coaxial structure that provides a uniform distribution of radiated power along its length without leakage of power to the connecting coaxial transmission line. In accordance with one embodiment of the invention, one of the critical aspects of collinear array antenna 22 is the apertures 56 in the distal section 46 which assist in the collection of hazardous materials by providing a path for the flow of heated liquid or gaseous toxic materials from the contaminated region into the distal section 46 of antenna 22. The apertures 56 may be of any desired size and spacing, depending on the rate of production of fluid material from the contaminated region and on the size of fractured pieces of the subsurface formation which cannot be allowed to pass into antenna 22.

As described in Kasevich et al, U.S. Pat. No. 4,700,716, collinear array antenna 22 is formed by providing circumferential gaps 60 in the outer conductor 62 to expose the dielectric core 64 of the transmission line structure. Preferably, the widths of gaps 60 are about the same size as the distance between center conductor 66 and outer conductor 62. Core 64 may comprise a suitable solid dielectric insulator, such as aluminum oxide or teflon. Gaps 60 provide excitation feeds for more remote, for example, more distal end, antenna sections and result in the equivalent of more than one antenna pattern being generated from the length of the center conductor. The electrical lengths of these antenna sections are harmonically related to each other.

In accordance with the theoretical and experimental teaching of Altschuler ("The Traveling-Wave Linear Antenna," E. E. Altschuler, Cruft Laboratory, Harvard University, Cambridge, Mass., *Scientific Report No. 7*, May 5, 1960), an essentially traveling-wave distribution of current can be produced on a linear antenna by inserting a resistance of suitable magnitude one-quarter wavelength from the end of the antenna. The effect of such resistance is to significantly change the radiation pattern of the antenna and therefore, in the present application, its heating pattern for the hazardous material-containing volume. The collinear array antenna 22 of the present invention is therefore provided with the appropriate value of resistance about one-quarter wavelength from the end of the distal section. By changing the applied frequency, or the location of the resistance, the distribution of heat around the antenna may therefore be changed or "steered" in planes passing through the antenna axis.

In operation, as the transmitted power from RF generator 20 is delivered through coaxial line 24 (formed by inner and outer conductors 28 and 30), each antenna section is excited and electromagnetic energy is radiated from the antenna and is absorbed by the contaminated region.

Figure 4:
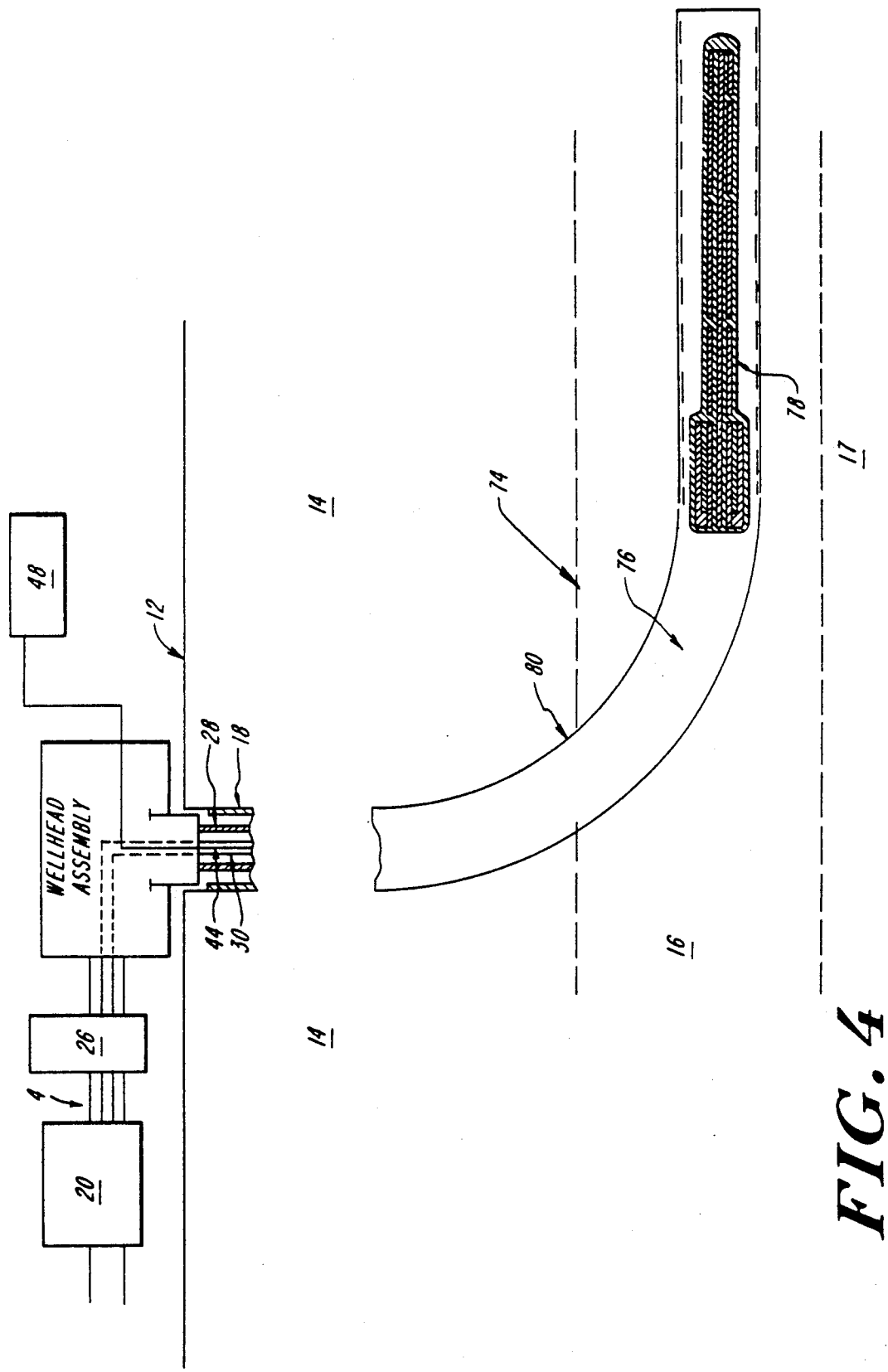
FIG. 4 is a vertical schematic sectional view of a flexible antenna apparatus inserted into a substantially horizontal borehole.

Referring to FIG. 4, a flexible or semi-rigid antenna apparatus 74 can be inserted into a substantially horizontal borehole 76 for heating and recovering hazardous materials from contaminated region 16. Flexible antenna apparatus 74 is designed for use in a horizontal borehole 76 to provide a more economical recovery of hazardous materials since fewer drilled holes are required when horizontal boreholes are used. The flexible antenna apparatus can be directed, via a horizontal borehole, underneath an existing structure for the removal of toxic materials without disturbing the structure.

The flexible antenna apparatus 74 may consist of a flexible or semi-rigid collinear antenna array 78 or a flexible or semi-rigid coaxial transmission line 80 or both. Flexible coaxial transmission line 80 and flexible collinear antenna 78 can be constructed from a composite of any of a number of different materials, including fiberglass, ceramics, teflon, plastics, metal laminates, composite materials of insulators and conductors, epoxy, fiber, clay-filled phenolics, and reinforced epoxy. Alternatively, the flexible coaxial transmission line and/or flexible collinear array antenna may be fabricated with flexible mechanical joints.

Figure 5:
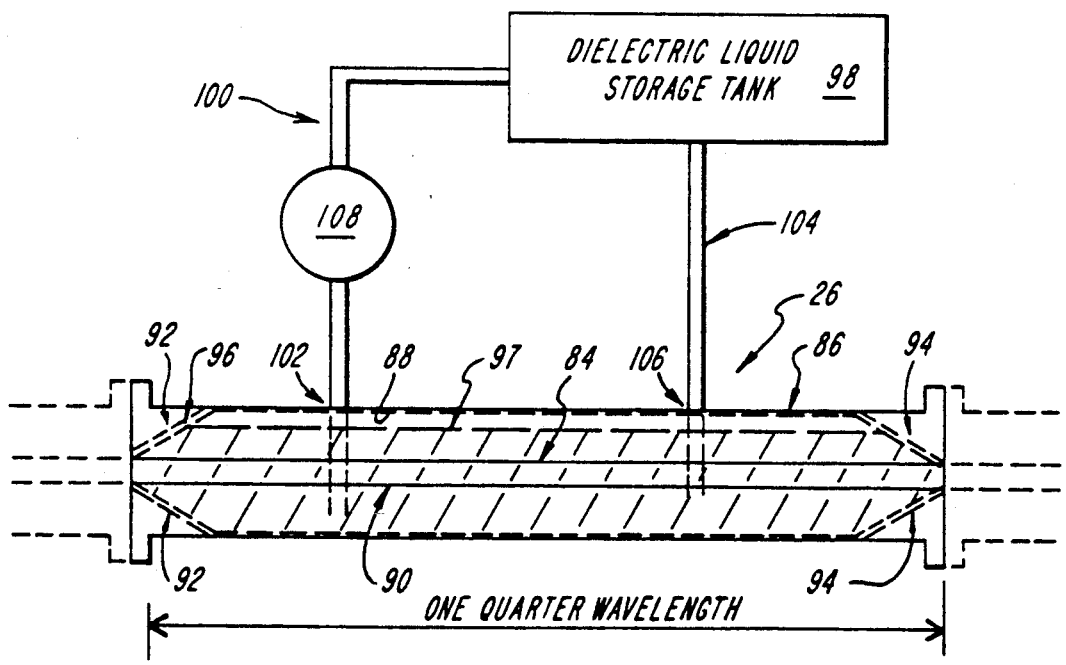
FIG. 5 is an enlarged cross-sectional view of the coaxial liquid dielectric impedance transformer shown in FIG. 1.

As a means of establishing efficient impedance matching between RF generator 20 and radio frequency antenna 22, which may be immersed in liquid material in sump 42, a coaxial liquid-dielectric impedance transformer 26 is provided (See FIG. 1). Referring to FIG. 5, coaxial transformer 26 can be essentially a horizontally or vertically disposed liquid-containing (for example, silicone oil) vessel having an inner conductor 84 and an outer conductor 86 to provide a specified characteristic impedance. (Preferably, the size of the diameter of inner conductor 84 is adjustable.) The inner surface 88 of outer conductor 86 and the outer surface 90 of inner conductor 84 are lined with a non-conductive substance (for example, plastic or PVC) which is sealed at proximal flanges 92 and distal flanges 94 to form a dielectric liquid vessel 96. The length of the vessel 96 is one-quarter wavelength. The dielectric liquid level 97 in a vessel 96 controls the electrical length of the transformer and, therefore, its ability to transform (that is, match) the coaxial line impedance to the antenna impedance. Therefore, the dynamic impedance match between RF generator 20 and the downhole antenna can be adjusted to insure maximum power flow to the antenna and to insure a satisfactory impedance measurement, as represented by the Voltage Standing Wave Ratio (VSWR).

In order to adjust the liquid level within transformer 26, a dielectric liquid reservoir 98 is provided in liquid communication with transformer 26 through a flow line 100 coupled to an inlet 102 and a flow line 104 coupled to an outlet 106. A pump 108 is provided as a means for transporting dielectric liquid between a dielectric liquid reservoir 98 and coaxial transformer 26.

METHOD OF OPERATION

In one mode of operation, referring to FIGS. 1-3, the high power RF generator 20, which operates in either a continuous wave (cw) or a pulsed mode, supplies electromagnetic energy over the coaxial transmission line 24 to downhole radio frequency antenna 22. The dielectric heating produced by the RF antenna extends radially away from the antenna and into contaminated region 16.

The radial extent of the heating pattern from a single borehole apparatus will vary as a function of the operating frequency, the length of the RF antenna, and the electrical conductivity and dielectric constant of the lossy media (contaminated region 16). For example, other parameters being constant, applying energy at a frequency of 1 megahertz (MHz) will provide approximately a 100 foot diameter heating zone for the enhanced recovery of hazardous materials. In comparison, applying energy at a frequency of 27 MHz will provide approximately a 24 foot diameter heating zone.

Water converted to steam in the contaminated region by RF energy will significantly enhance the extent of heat penetration from the borehole because of the attendant reduction in the material dielectric losses where steam is produced. Steam does not absorb RF energy while water does. When the system produces steam, the diameter of the heating zone will typically expand to where the steam is not present and water begins. This expansion could be significant (for example, from the original 24 foot heating diameter to a 100 foot heating diameter at 27 MHz; and from the 100 foot heating diameter at 1 MHz to a several hundred foot heating diameter).

As region 16 heats from the absorption of RF energy, any flowable solid materials will become less viscous or liquified and begin to flow toward borehole 10 if the borehole is kept at a low pressure (for example, pumped). The apertures (or perforations) 56 in the distal section 46 of antenna 22 act as portals to collect the heated flow. The heated flow can be transported by production flow line 44 to storage facility 48. As shown in FIG. 1, the production flow line 44 extends from storage facility 48 through the center conductor 28 of coaxial transmission line 24 and the center conductor of collinear antenna 22, through an opening in the distal section 46 of antenna 22, and into sump 42.

Depending on the particular design of the apparatus employed, the flow either will collect in sump 42 at the bottom of borehole 10 before being transported to storage facility 48, or will be immediately transported to storage facility 48 as it enters distal section 46 of antenna 22. A mechanical pump (or other pressure source) is located either on the earth's surface, in the final quarter-wavelength section of antenna 22, or in sump 42. The reduction in viscosity of the hazardous materials will also make pumping easier.

Certain hazardous material(s) are only found in a liquid state. In those instances, the RF energy is employed to increase the temperature of the hazardous material-containing volume and thereby volatilize those hazardous materials. The resultant vapor by-products are transported from the hazardous material-containing volume (for example, soil) to a storage facility via the production flow line of the antenna apparatus. Alternatively, the hazardous vapor by-products can be removed by the use of a vacuum means. Accordingly, this invention describes a method of efficiently extracting the hazardous vapors of contaminants which are not naturally volatile at ambient temperatures. Compounds that can be effectively extracted using this method include gasoline, diesel fuel, hexane, benzene, toluene, ethyl benzene, carbon tetrachloride, chloroform, acetone and methanol.

The use of radio frequency is preferable to the prior art methods of using steam because (1) in situ decontamination can be more effectively controlled using RF energy, (2) RF is more efficient at higher temperature for organic compounds with higher boiling points, and (3) RF does not add water to the volume.

In some instances, there will be no need to actually extract any materials from region 16 or from a water-containing region. According to this aspect of operation of the invention, the hazardous materials are rendered innocuous in situ because either (1) the region 16 or a water-containing region is maintained at an elevated temperature for an extended period of time sufficient for substantial pyrolysis, or (2) one or more microorganisms, which are known to degrade certain hazardous materials and whose proliferation is temperature dependent, are available in region 16 or water-containing region.

The apparatus and method of the present invention are useful in a number of environmental applications, including, but not limited to, those which are described below.

PHASE-MODULATED MULTIPLE APPARATUS SYSTEM

In yet another embodiment of the invention, a multiple apparatus phased array system heats and/or recovers hazardous materials from larger land regions or water-containing regions by employing a multiple antenna apparatus system. To treat very large areas in a cost-effective manner, a multiple apparatus system will typically consist of at least two, and preferably three or more, individual antenna apparati inserted in boreholes arranged in a geometric pattern. A multiple apparatus system may consist of flexible or semi-rigid antenna apparati inserted in either substantially vertical boreholes, substantially horizontal boreholes or a combination of substantially vertical boreholes and substantially horizontal boreholes.

Figure 6:
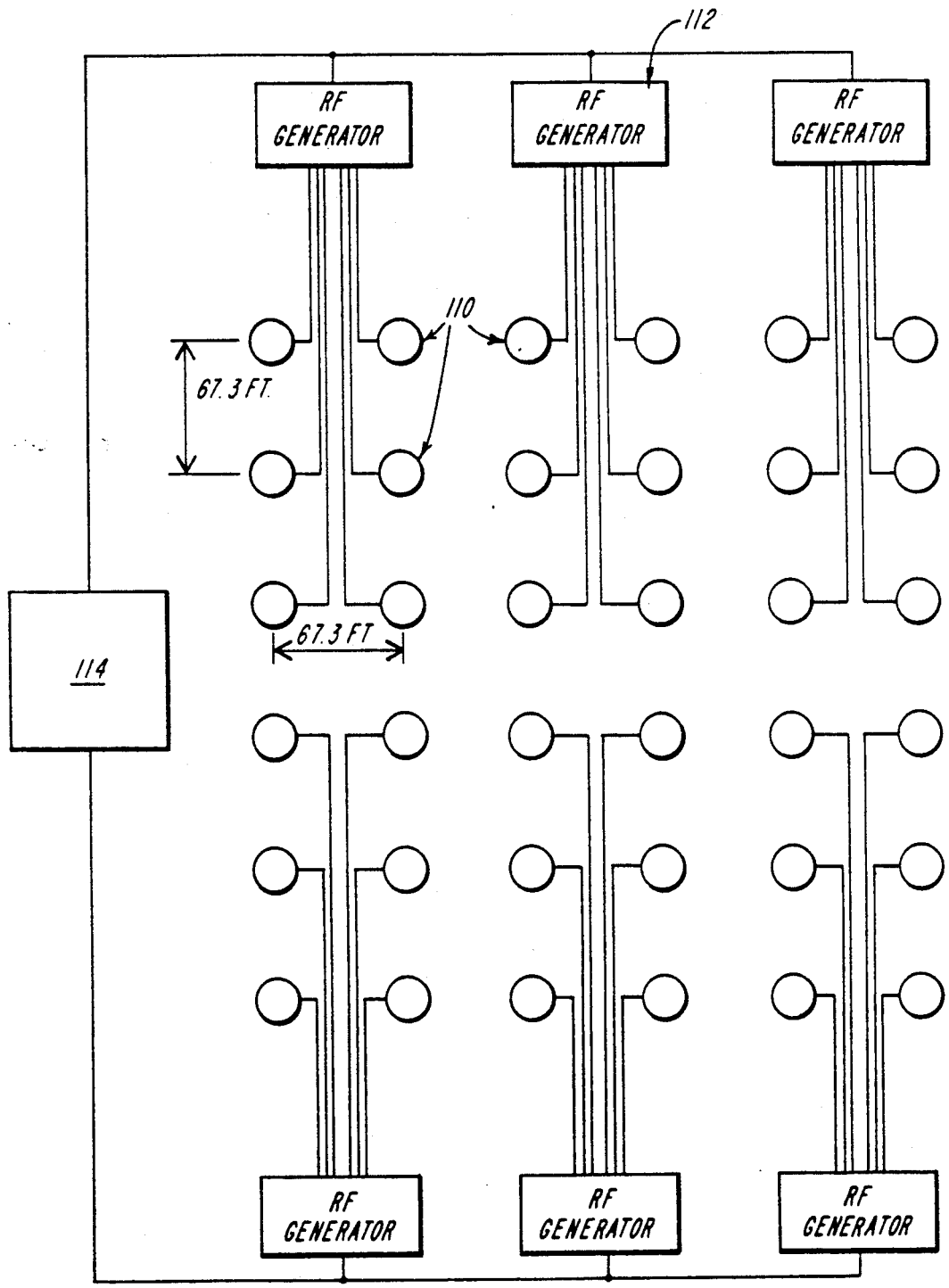
FIG. 6 is a schematic representation of a top view of a multiple antenna system.

Referring to FIG. 6, a multiple apparatus system is shown for use in a hypothetical situation in which the contaminated region is 20 feet thick and occupies a square shaped area of approximately three acres. At a radio frequency of approximately 14 MHz, this system consists of thirty-six antenna apparati 110 (described in FIG. 1) disposed in boreholes drilled in a square grid pattern, the grids being approximately sixty-seven feet apart. Each illustrated antenna apparatus is approximately four to eight inches in diameter. The vertical borehole depth may be up to several hundred feet or more to the bottom of the contaminated region. All antennas are powered by RF generators 112 (for example, approximately 25 kilowatts of power per borehole) that may be operated in either a cw or pulsed mode. Both the borehole temperature and feed-line VSWR are monitored in real time. This information is supplied to and used by a central computer 114 for power and phase control adjustment (throughout the heating period) to insure maximum production rates with time.

Figure 7:
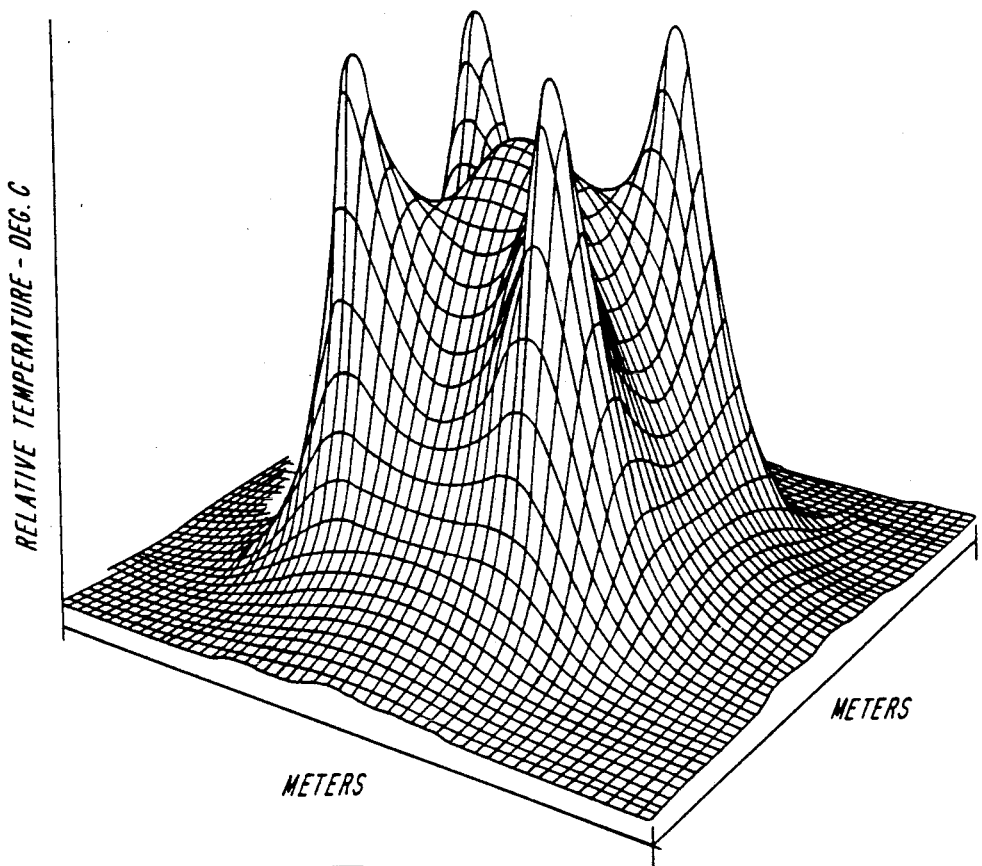
FIG. 7 is a graphical representation demonstrating the near-uniform heating generated in a multiple apparatus system.

The phased array system is capable of providing a near-uniform disposition of electromagnetic power in the contaminated region by proper antenna design, borehole spacing and choice of frequency and phase modulation. Referring to FIG. 7, the three-dimensional temperature distribution profile represents the temperature uniformity generated by a four apparatus system (the boreholes being at the corners of a square) when all four input currents to the antennas are in time phase. In this example, the energy from one apparatus, at the selected frequency, will arrive at a second apparatus out of phase and will cancel a portion of the radiating field gradient. Thus, the heating effect in the areas immediately adjacent the respective apparati will be reduced while the radiating fields will have an additive effect in the central areas of the contaminated region. Thus, when multiple apparati are properly spaced with different current phasings, that may vary in time, a volumetric heating pattern is generated that produces an essentially uniform average temperature distribution throughout the contaminated region.

In operation, the volume near each borehole will initially absorb most of the radiated energy, and hence be higher in temperature than areas distant from the borehole; but this difference in temperature is reduced by using pulsed or reduced cw power into each antenna for a short period of time while still heating the contaminated region further away (for example, using natural heat conduction in the formation to even out the temperature distribution). Eventually, a steady-state condition will exist whereby heating is relatively uniform throughout the contaminated region. The heat distribution and focusing may be continuously altered by the computer to maintain even temperatures by phase modulation.

Figure 8A:
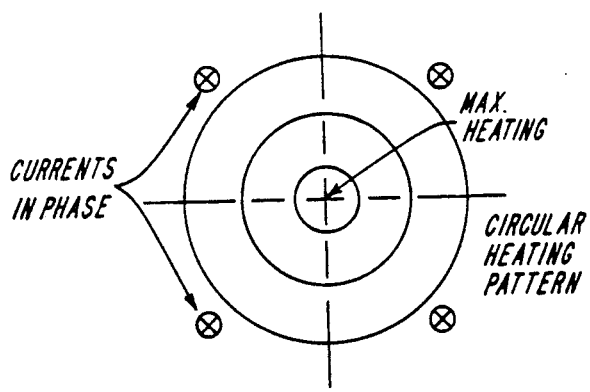
FIGS. 8(a) and 8(b) are schematic representations of the temperature profiles generated by two different current phasings in a phase-modulated multiple antenna system.
Figure 8B:
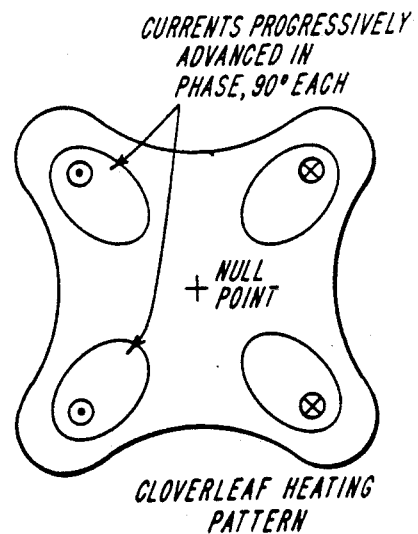

In the multiple apparatus system disclosed herein, the phasing of currents may be varied on each antenna either sequentially or simultaneously (in time) to permit great latitude in the control of heating pattern dynamics and to insure temperature uniformity and temperature control near and away from the boreholes. Referring to FIG. 8, temperature profiles for two different phase conditions provide two different heating patterns. An example of a four borehole system with all currents in phase is shown in FIG. 8(a). An example of the same system with the relative current phases, working clockwise, being 0°, 90°, 180°, 270° is shown in FIG. 8(b). As illustrated, when all currents are in phase (FIG. 8(a)) a near-uniform heating pattern is generated in the equatorial plane; and a 90 degree progressive phase pattern (FIG. 8(b)) provides a null in the equatorial plane at the center of the array. A combination of these phasings, as well as intermediate values, will provide a steerable heating pattern to compensate for heat loss by conduction and to avoid hot spots in the pattern.

Still referring to FIG. 6, the RF power transmitted to each apparatus of the multiple apparatus system is controlled by the central computer 114. Each RF generator is in electrical communication with central computer 114. In addition, the central computer will receive information from each antenna apparatus 110 regarding the rate of waste extraction, the VSWR, and the temperature of the contaminated region, so that individual adjustments in power cycling, current phasing and power level can be made.

The number of RF generators employed in a multiple apparatus system depends on the production rate desired. For example, a single 25 KW generator may be used to heat several boreholes sequentially in time. Twenty-five kilowatts of power will be applied to borehole 1 for a period of time sufficient to initiate extraction of hazardous materials. Borehole 1 will continue to extract materials as the RF generator is switched to borehole 2. Once production begins from borehole 2, the RF generator will be switched to borehole 3 and at boreholes 1 and 2 pumping will begin or continue. The residual heat near boreholes in 1 and 2 will be sufficient for some period of time to maintain production. As the production rate in borehole 1 diminishes, the generator will be electrically switched back to borehole 1 to maintain its production. By employing this matrix approach, the number of generators required is reduced.

LATERAL WAVE PROPAGATION SYSTEM

Figure 9:
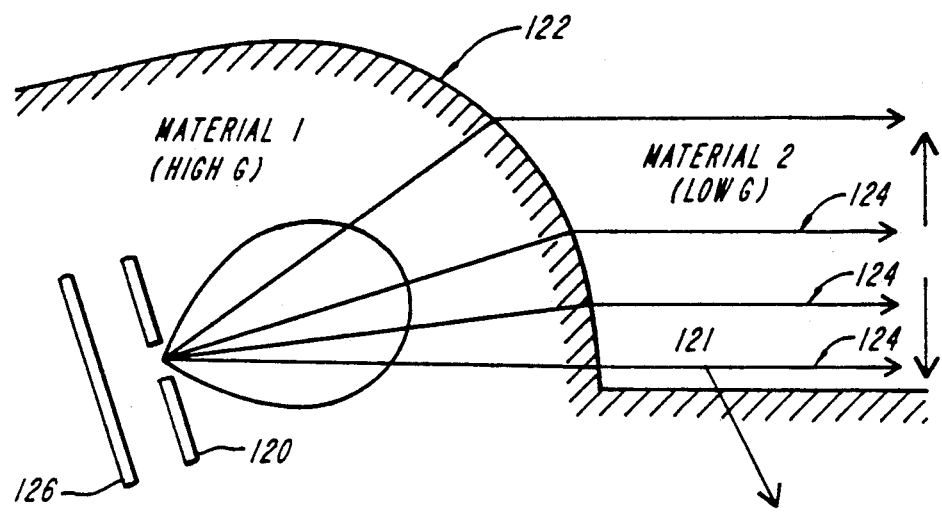
FIG. 9 is a schematic representation of a top view of a lateral wave propagation system.

In another embodiment of the invention, a lateral wave propagation system effects decontamination of hazardous materials which are situated in a thin layer at or near the earth's surface. Referring to FIG. 9, a lateral wave propagation system is shown for use in achieving efficient coupling of radio frequency energy in a thin layer of hazardous material. This system is based on the sub-surface radio surface wave launcher disclosed in Kopf et al, U.S. Pat. No. 3,803,616.

According to this aspect of the invention, radio frequency antenna 120 (for example, collinear array antenna) is horizontally embedded into the thin layer of hazardous materials. Cylindrical lens system 122 is positioned above radio frequency antenna 120 so as to intercept a large portion of its radiation pattern for conversion into surface waves 124. Preferably, this lens system is in the form of a berm with the antenna positioned within. The berm is made either from earth material or from a material having a high dielectric constant (for example, water) and which is shaped to provide lens action. In this way, the radiation field of the radio frequency antenna is focused into the lower dielectric constant hazardous waste material 121 to be heated. In addition, a reflector 126 can be placed behind the radio frequency antenna to improve the efficiency of coupling to the layer 121.

During operation, the radio frequency antenna excites a surface wave that dissipates radio frequency energy within the thin layer while radio frequency energy outside the thin layer rapidly decays. Thus, maximum coupling of radio frequency energy into a thin layer of lossy material is possible by the employment of lateral waves (or surface waves) excited by antennas close to the electrically lossy layer. The hazardous materials present are rendered relatively innocuous by either (1) maintaining the thin layer at elevated temperatures for an extended period of time sufficient for substantial pyrolysis or (2) introducing at least one microorganism into the thin layer that will degrade hazardous wastes faster in the presence of heat generated by the radio frequency antenna. Alternatively, the hazardous materials or their resultant vapor by-products are collected through apertures in the section of the antenna and transported to an above-ground storage facility in the manner described above.

THE EXTRACTION OF HAZARDOUS WASTES TRAPPED IN IMPERVIOUS SUBSURFACE FORMATIONS

The antenna apparatus of the invention can be employed for extracting hazardous wastes from impervious subsurface formations (for example, rock formations, soils, and shale-like materials) which lack suitable fractures or passages to allow the flow of the liquid materials. For example, using the methods of this invention, the hydraulic conductivity of the subsurface formation can be increased to about $1 \times 10^{-2}$ cm/sec for effective recovery by pumping.

Present methods to extract wastes trapped in such formations rely on the use of powerful explosives. These techniques have obvious limitations insofar as they cannot be employed in situations in which the remediation site is in close proximity to buildings or other structures, or human or animal activity.

According to this aspect of the invention, an RF antenna having a frequency range of between 100 kilohertz (KHz) and about 1 gigahertz (GHz) is coupled to a coaxial transmission line and inserted in either vertical or horizontal borehole(s) (as illustrated, for example, in FIGS. 1, 4, and 6) formed in the rock formation containing toxic wastes. The moisture contained in the rock provides for the rapid absorption of RF energy, thereby creating thermal gradients. These gradients will cause the rock to fracture. Preferably, several antenna apparati are employed and the current to the antennas can be phase modulated, as illustrated in FIGS. 8(a) and 8(b), to create a movable focal point which can be shifted in a prescribed pattern throughout the subsurface volume. The continuous fracturing of rock and other subsurface formations creates pathways for the hazardous liquids to flow to nearby wells for collection and extraction. Thus, hazardous wastes trapped in underground rock formations can now be removed even when those wastes are situated in close proximity to or even under buildings or other structures.

THE REMOVAL OF ORGANIC OR INORGANIC MATERIALS FROM STORAGE TANKS

In another embodiment of the invention, electromagnetic energy can be used to assist in the removal of coal tar sludge residue and other petroleum-containing or organic or inorganic materials from storage tanks, railroad cars, and drums.

Figure 10:
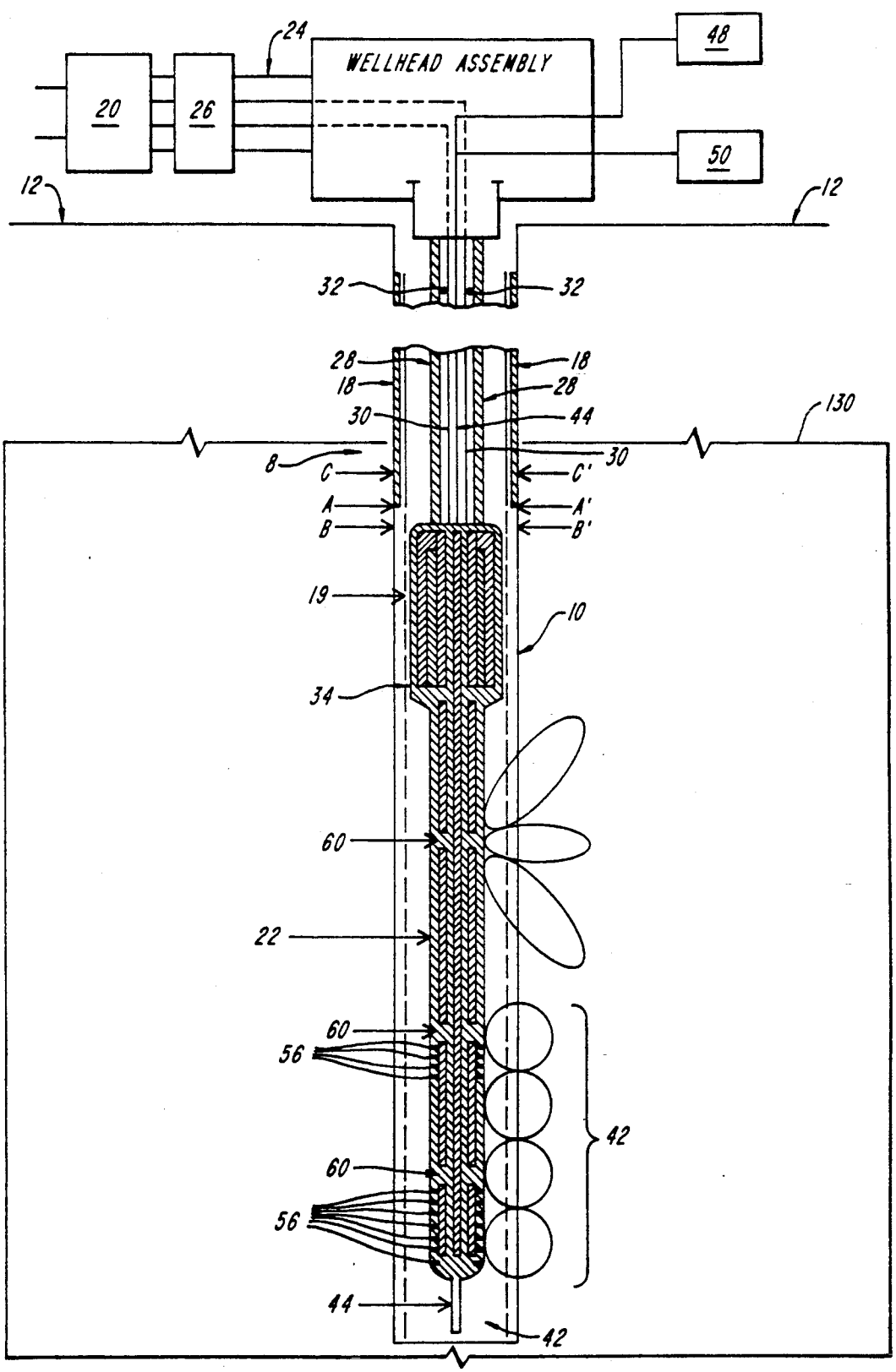
FIG. 10 is a vertical schematic sectional view of an antenna apparatus inserted into an underground storage tank contaminated with hazardous materials.

Referring to FIG. 10, a radio frequency antenna apparatus 8, such as the collinear array antenna described herein, is inserted into an underground storage tank 130 or other container, and then is energized using a radio frequency generator 20 positioned outside the container (for example, on the earth's surface). Alternatively, the radio frequency generator may be positioned within the antenna apparatus.

The heat generated by the antenna's RF radiation raises the temperature of the material (for example, coal tar), thereby making it more lossy. As a result, any flowable solid materials will become less viscous, liquified or volatized. The apertures 56 in the distal section of the antenna act as portals to collect the heated flow. The heated flow can be transported by production flow line 44 to storage facility 48. A mechanical pump, such as pump 50, or other pressure source is located, preferably, either outside the container or in the final quarter-wavelength section of antenna 22. As shown in FIG. 10, the production flow line 44 may extend from storage container 48 through the center conductor of collinear antenna 22, through an opening in the distal section 46 of antenna 22, and into the hazardous material. The liquid material is then collected and extracted in the manner described above.

The electromagnetic heating of coal tar sludge residue and other organic or inorganic materials is an environmentally-safe method for cleaning railroad cars, storage tanks, and drums.

THE ENHANCED MICROBIAL DEGRADATION OF HAZARDOUS WASTES

The RF heating method of the invention can also be used in conjunction with the bioremediation of hazardous materials. Bioremediation is a process that uses either naturally-occurring or genetically-engineered microorganisms to decompose toxic or hazardous wastes. Preferably, these microorganisms produce degradive enzymes which render certain hazardous wastes relatively innocuous. However, the microbial degradation of hazardous wastes in soil and water can be relatively slow. As a result, these hazardous materials may migrate great distances, and thereby increase the risk of exposure, before they can be transformed into non-toxic end products.

For example, the contamination of soil and groundwater with chlorinated aromatics (for example, chlorophenols) is worldwide. The compounds pose a serious health risk because they are readily accumulated in the food chain. In fact, chlorophenols are included in the U.S. Environmental Protection Agency Priority Pollutant Lists since they, especially 4-chlorophenol, are carcinogenic. Chlorinated aromatics compounds are produced as chemicals and then are either accidentally or intentionally released into the environment. Although they are most often formed through industrial pollution, they can be formed unintentionally in various ways. For example, the chlorination of drinking water which contains aromatic compounds will result in the formation of chlorinated aromatic compounds. Chlorophenols are used as fungicides, pesticide components, wood preservatives and the like.

A recent study by Weigel et al, "Degradation of 2,4-Dichlorophenol in Anaerobic Freshwater Lake Sediments," reported in Chapter 8 of *Emerging Technologies in Hazardous Waste Management*, ACS, 1990, demonstrates that the microbial transformation of 2,4-dichlorophenol into 4-chlorophenol in sediments is strongly temperature-dependent. Specifically, the transformation rates increase exponentially between 15° and 30° C. and dechlorinating occurs between 5° and 50° C.

In accordance with another particular embodiment of the invention, a method of catalyzing the microbial degradation of chlorinated aromatic compounds and other compounds including, but not limited to, benzene, toluene, ethylbenzene and xylene, uses a radio frequency antenna such is that of FIGS. 1 and 4. Because microbe activity is temperature-sensitive, their growth rate can be regulated with the application of radio frequency energy at frequencies which result in the absorption of energy thereby heating the microbes, soil matrix and the water-containing regions of the earth. For example, biodegradation using methotropic (methane consuming) bacteria can be used to destroy halogenated hydrocarbons.

There are many transformation steps which must take place in order to convert 2,4-dichlorophenol into end products which are relatively innocuous. Each transformation step can be carried out using microorganisms containing the gene for the appropriate degradive enzyme. Some researchers are using recombinant DNA techniques to construct bacterial strains which have the genes for various degradive enzymes and can, therefore, carry out more than one, and preferably all, the transformation steps necessary to render a toxic compound relatively innocuous.

According to the invention, the rate of microbial bioremediation can be accelerated in hazardous waste-containing volumes. This method involves the use of the radio frequency antenna apparatus described herein in conjunction with specifically-tailored microorganisms to provide for the enhanced degradation of hazardous wastes.

According to this aspect of the invention, an RF antenna, as described herein, having a frequency range of between about 0.5 MHz to about 100 MHz is disposed in the hazardous waste-containing volume. The radio frequency antenna is then energized by means of a radio frequency generator positioned on the earth's surface or in the antenna apparatus itself. The radio frequency waves radiating from the antenna are absorbed by the soil and/or water in the contaminated region, causing an increase in temperature in that region. When the temperature of the contaminated region reaches approximately 15° C. the appropriate microorganism(s) are introduced into the region. The temperature of the contaminated region is then slowly increased to the optimal temperature for the proliferation of the particular microorganism, preferably between 28° and 30° C. The degradation of the hazardous waste will be directly related to the multiplication rate of the microorganism.

Bioremediation is not usually possible in colder climates because microbial degradation requires an optimal temperature range for the transformation of hazardous wastes. The method of the invention provides for carrying out the bioremediation process using electromagnetic energy to heat the microbes and/or the materials in which they reside so that the bioremediation process can be conducted in colder climates.

ELECTRO-KINETIC ASSISTED METHOD FOR ENHANCED RECOVERY OF TOXIC METALS

In yet another embodiment of this invention, the RF antenna apparatus described herein is used in conjunction with the technique of electro-kinetics for the enhanced recovery of toxic metals (for example, chromium and copper) from hazardous material-containing volumes (for example, tar sands).

Figure 11:
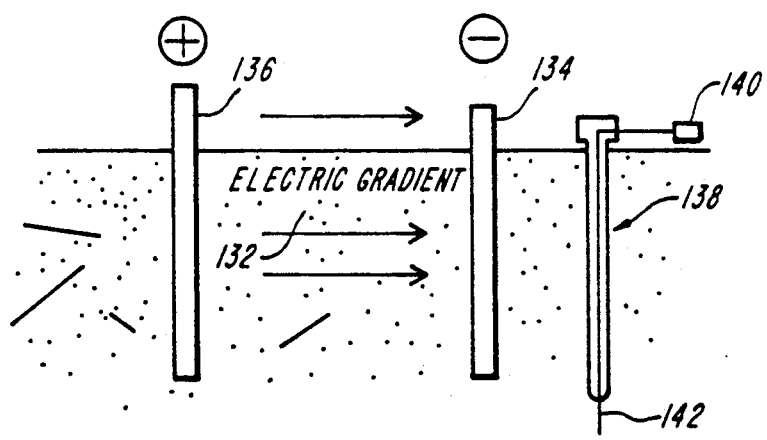
FIG. 11 is a vertical schematic sectional view of an electro-kinetic/radio frequency system.

Referring to FIG. 11, a DC electric field is created in hazardous material-containing volume 132 by applying direct current between negatively-charged electrode (cathode) 134 and positively-charged electrode (anode) 136. As the electric field is applied through anode 136, cations (positively-charged ions) will be forced to migrate through groundwater and toward the negatively-charged region (cathode 134) of the electric field and urge the toxic materials to move in the same direction.

Substantially contemporaneous with the application of the electric field, radio frequency antenna apparatus 138, disposed in or near volume 132, is activated. Electromagnetic energy produced from antenna apparatus 138 is radiated into hazardous material-containing volume 132 to render the hazardous materials less viscous, thereby increasing the flow rate of the toxic metals.

Preferably, antenna apparatus 138 will be disposed in the hazardous material-containing volume in close proximity to cathode 134 so that toxic metals which collect in the vicinity of cathode 134 can be efficiently and rapidly transported from the subsurface formation to storage facility 140 via production flow line 142 of antenna apparatus 138.

Additions, subtractions, deletions and other modifications of the described embodiments will be apparent to those practiced in the art and are within the scope of the following claims.

What is claimed is:

1. A method for the extraction of hazardous materials from a hazardous material-containing volume, comprising the steps of:
    radiating electromagnetic energy into said volume by means of a radio frequency antenna apparatus disposed in a borehole;
    rendering said materials less viscous; and
    transporting said materials to a storage facility through a production flow line which extends from said distal section of said antenna apparatus to said storage facility.

2. The method of claim 1 further comprising the step of projecting said production flow line through an opening in said distal section of said antenna apparatus and into a material collection region of said borehole.

3. The method of claim 1 wherein said hazardous material-containing volume is a water-containing region of the earth.

4. The method of claim 3 wherein said water-containing region is one of a lake and a pond.

5. A method for the in situ decontamination of a hazardous material-containing volume, comprising the steps of:
    radiating electromagnetic energy into said volume by means of a radio frequency antenna apparatus disposed in said volume; and
    rendering said hazardous materials relatively innocuous.

6. The method of claim 5 further comprising the steps of:
    collecting said materials through a plurality of apertures in a distal section of said apparatus; and
    transporting said materials to a storage facility through a production flow line which extends from said distal section of said antenna apparatus to said storage facility.

7. The method of claim 5 wherein said rendering said hazardous material innocuous includes the step of maintaining said volume at elevated temperatures for an extended period of time sufficient for substantial pyrolysis.

8. The method of claim 5 wherein said rendering said hazardous material innocuous includes the step of introducing at least one temperature-sensitive microorganism into said volume, which microorganism degrades at least some of said hazardous materials to form relatively innocuous materials.

9. The method of claim 5 wherein said rendering said hazardous materials innocuous includes the steps of:
    maintaining said volume at elevated temperatures for a period of time sufficient to convert liquid materials into vapor by-products;
    collecting said vapor by-products through a plurality of apertures in a distal section of said apparatus; and
    transporting said vapor by-products to a storage facility through a production flow line which extends from said distal section of said antenna apparatus to said storage facility.

10. A method for the extraction of hazardous materials from a large hazardous waste-containing volume, comprising the steps of:
    radiating electromagnetic energy into said large volume by means of a plurality of antenna aparrati arranged according to a selected grid pattern wherein the phase of the energy delivered to each said apparatus is varied relative to other apparati for effecting a selected heating of said volume; and
    transporting said materials to a storage facility through a production flow line.

11. A method for the extraction of hazardous materials from a storage tank, comprising the steps of:
    radiating electromagnetic energy into said storage tank by means of a radio frequency antenna apparatus disposed in said storage tank; and
    transporting said recovered materials to a storage facility through a production flow line which extends from said distal section of said antenna apparatus to said storage facility.

12. The method of claim 11 further comprising the step of projecting said production flow line through an opening in said distal section of said antenna apparatus and into said hazardous material.

13. A method for the extraction of hazardous materials trapped in an impervious subsurface formation, comprising the steps of:
    inserting a radio-frequency antenna apparatus in a borehole in close proximity to said formation;
    radiating electromagnetic energy into said formation by means of said radio-frequency antenna, to produce fractures in said formation; and transporting said materials to a storage facility through a production flow line which extends from a distal section of said antenna apparatus to said storage facility.

14. A method for catalyzing the microbial degradation of hazardous materials located in a hazardous waste-containing volume, comprising the steps of:
radiating electromagnetic energy into said volume by means of a radio frequency antenna apparatus, and
supplying said volume with one or more temperature-sensitive microorganisms which have the capability of rendering said materials relatively innocuous.

15. The method of claim 14 wherein said volume is a land-disposal site.

16. A method for the extraction of hazardous materials from a hazardous material-containing volume situated beneath a structure, comprising the steps of:
radiating electromagnetic energy into said volume by means of a flexible radio frequency antenna apparatus disposed in a substantially horizontal borehole directed underneath said structure;
rendering said materials less viscous; and
transporting said materials to a storage facility through a production flow line which extends from said distal section of said antenna apparatus to said storage facility.

17. The method of claim 16 further comprising the step of projecting said production flow line through an opening in the distal section of said antenna apparatus and into a material collection region of said borehole.

18. A method for the in situ decontamination of a hazardous waste-containing volume situated underneath a structure, comprising the steps of:
radiating electromagnetic energy into said volume by means of a flexible radio frequency antenna apparatus disposed in a substantially horizontal borehole directed underneath said structure; and
rendering said hazardous materials relatively innocuous.

19. The method of claim 18 further comprising the steps of: collecting said materials through a plurality of apertures in a distal section of said apparatus; and
transporting said materials to a storage facility through a production flow line which extends from said distal section of said antenna apparatus to said storage facility.

20. The method of claim 18 wherein said rendering said hazardous material innocuous includes maintaining said volume at elevated temperatures for an extended period of time sufficient for substantial pyrolysis.

21. The method of claim 18 wherein said rendering said hazardous material innocuous includes introducing at least one temperature-sensitive microorganism into said volume, which microorganism degrades at least some of said hazardous materials to form relatively innocuous materials.

22. A method for the decontamination of a thin layer of hazardous material, comprising the steps of:
radiating electromagnetic energy into said thin layer by means of a radio frequency antenna apparatus horizontally embedded in said thin layer;
focusing said electromagnetic energy into a lateral wave mode by means of a lens system embedded adjacent to said antenna;
maintaining said thin layer at elevated temperatures for a period of time sufficient to convert liquid materials into vapor by-products;
collecting said vapor by-products through a plurality of apertures in a distal section of said apparatus; and
transporting said vapor by-products to a storage facility through a production flow line which extends from said distal section of said antenna apparatus to said storage facility.

23. A method for the decontamination of a thin layer of hazardous material, comprising the steps of:
radiating electromagnetic energy into said thin layer by means of a radio frequency antenna apparatus horizontally embedded in said thin layer;
focusing said electromagnetic energy into a lateral wave mode by means of a lens system embedded adjacent to said antenna; and
rendering said hazardous materials relatively innocuous.

24. The method of claim 23 further comprising the steps of:
collecting said materials through a plurality of apertures in a distal section of said apparatus; and
transporting said materials to a storage facility through a production flow line which extends from said distal section of said antenna apparatus to said storage facility.

25. The method of claim 23 wherein said rendering said hazardous material innocuous includes maintaining said thin layer at elevated temperatures for an extended period of time sufficient for substantial pyrolysis.

26. The method of claim 23 wherein said rendering said hazardous material innocuous includes introducing at least one temperature-sensitive microorganism into said thin layer, which microorganism degrades at least some of said hazardous materials to form relatively innocuous materials.

27. A method for recovering toxic metals from a hazardous material-containing volume, comprising the steps of:
creating a DC electric field in said volume to direct the migration of said toxic metals toward a negatively-charged region of said electric field;
radiating electromagnetic energy into said volume to increase the flow rate of said toxic metals; and
transporting said toxic metals from said volume to a storage facility.

28. The method of claim 1 wherein said hazardous material-containing volume is a storage tank.

29. The method of claim 1 wherein said hazardous material-containing volume is a railroad car.

30. The method of claim 1 wherein said hazardous material-containing volume is a land-disposal site.

31. The method of claim 14 wherein said hazardous waste-containing volume is a storage tank.

32. The method of claim 14 wherein said hazardous waste-containing volume is a railroad car.

* * * * *

UNITED STATES PATENT AND TRADEMARK OFFICE
CERTIFICATE OF CORRECTION

PATENT NO. : 5,152,341

DATED : October 6, 1992

INVENTOR : Raymond S. Kasevich

It is certified that error appears in the above-identified patent and that said Letters Patent is hereby corrected as shown below:

On the title page, under Assignee, delete "Raymond S. Kasevich, Woburn, Mass." and insert --KAI Technologies, Inc., Woburn, Mass.

Signed and Sealed this

Fourteenth Day of September, 1999

Attest:

Q. TODD DICKINSON

*Attesting Officer*   Acting Commissioner of Patents and Trademarks